US011987512B2

(12) United States Patent
Huang (10) Patent No.: US 11,987,512 B2
(45) Date of Patent: *May 21, 2024

(54) METHODS FOR TREATING SELENOCYANATE IN WASTEWATER

(71) Applicant: The Texas A&M University System, College Station, TX (US)

(72) Inventor: Yongheng Huang, College Station, TX (US)

(73) Assignee: The Texas A&M University System, College Station, TX (US)

(*) Notice: Subject to any disclaimer, the term of this patent is extended or adjusted under 35 U.S.C. 154(b) by 142 days.

This patent is subject to a terminal disclaimer.

(21) Appl. No.: 17/586,041

(22) Filed: Jan. 27, 2022

(65) Prior Publication Data
US 2022/0144674 A1    May 12, 2022

Related U.S. Application Data

(63) Continuation of application No. 15/769,279, filed as application No. PCT/US2016/057911 on Oct. 20, 2016, now Pat. No. 11,235,994.
(Continued)

(51) Int. Cl.
*C02F 1/72* (2023.01)
*C02F 1/70* (2023.01)
(Continued)

(52) U.S. Cl.
CPC .............. *C02F 1/722* (2013.01); *C02F 1/705* (2013.01); *C02F 1/76* (2013.01);
(Continued)

(58) Field of Classification Search
CPC .. C02F 1/705; C02F 1/72; C02F 1/722; C02F 1/76; C02F 2101/106; C02F 2101/18;
(Continued)

(56) References Cited

U.S. PATENT DOCUMENTS 5,071,568 A    12/1991 Bennett et al.
5,510,040 A    4/1996 Miller et al.
(Continued)

FOREIGN PATENT DOCUMENTS

CN    102173524 B    7/2012
WO    99/20569 A1    4/1999
(Continued)

OTHER PUBLICATIONS

Office Action dated Feb. 15, 2023, issued in corresponding Canadian Application No. 3,002,592, filed Oct. 20, 2016, 5 pages.
(Continued)

*Primary Examiner* — Patrick Orme
(74) *Attorney, Agent, or Firm* — Christensen O'Connor Johnson Kindness PLLC (57) ABSTRACT

Methods and systems for reducing the concentration of selenocyanate in water. In the methods and systems, water containing selenocyanate is treated an oxidant to provide oxidant-treated water, which is then contacted with a zero-valent iron treatment system comprising (a) a reactive solid comprising zero-valent iron and one or more iron oxide minerals in contact therewith and (b) ferrous iron.

20 Claims, 2 Drawing Sheets

Related U.S. Application Data (60) Provisional application No. 62/244,693, filed on Oct. 21, 2015.

(51) Int. Cl.
*C02F 1/76* (2023.01)
*C02F 101/10* (2006.01)
*C02F 101/18* (2006.01)
*C02F 101/20* (2006.01)
*C02F 101/36* (2006.01)
*C02F 103/06* (2006.01)
*C02F 103/10* (2006.01)
*C02F 103/18* (2006.01)
*C02F 103/36* (2006.01)

(52) U.S. Cl.
CPC .... *C02F 2101/106* (2013.01); *C02F 2101/18* (2013.01); *C02F 2101/20* (2013.01); *C02F 2101/36* (2013.01); *C02F 2103/06* (2013.01); *C02F 2103/10* (2013.01); *C02F 2103/18* (2013.01); *C02F 2103/365* (2013.01)

(58) Field of Classification Search
CPC .............. C02F 2101/20; C02F 2101/36; C02F 2103/06; C02F 2103/10; C02F 2103/18; C02F 2103/365
See application file for complete search history.

(56) References Cited

U.S. PATENT DOCUMENTS

| | | | |
|---|---|---|---|
| 11,235,994 B2 * | 2/2022 | Huang | C02F 1/76 |
| 2011/0174743 A1 * | 7/2011 | Huang | C02F 1/705 |
| | | | 210/201 |
| 2018/0305230 A1 | 10/2018 | Huang | |

FOREIGN PATENT DOCUMENTS

| | | |
|---|---|---|
| WO | 2011/112693 A2 | 9/2011 |
| WO | 2015/164316 A1 | 10/2015 |

OTHER PUBLICATIONS

International Preliminary Report on Patentability dated Apr. 24, 2018, issued in corresponding International Application No. PCT/US2016/57911, filed Oct. 20, 2016, 9 pages.

Non-Final Office Action dated Nov. 7, 2019, from U.S. Appl. No. 15/769,279, filed Apr. 18, 2018, which the present application is a continuation, 20 pages.

Final Office Action dated Apr. 23, 2020, from U.S. Appl. No. 15/769,279, filed Apr. 18, 2018, which the present application is a continuation, 21 pages.

Final Office Action dated Sep. 4, 2020, from U.S. Appl. No. 15/769,279, filed Apr. 18, 2018, which the present application is a continuation, 23 pages.

Non-Final Office Action dated Mar. 12, 2021, from U.S. Appl. No. 15/769,279, filed Apr. 18, 2018, which the present application is a continuation, 16 pages.

Final Office Action dated Aug. 24, 2021, from U.S. Appl. No. 15/769,279, filed Apr. 18, 2018, which the present application is a continuation, 6 pages.

Office Action dated Jul. 4, 2022, issued in corresponding Canadian Application No. 3,002,592, filed Oct. 20, 2016, 5 pages.

International Search Report and Written Opinion dated Jan. 13, 2017, issued in corresponding International Application No. PCT/US2016/57911, filed Oct. 20, 2016, 10 pages.

Extended European Search Report dated Mar. 1, 2019, issued in corresponding European Application No. 16858213.8, filed Oct. 20, 2016, 9 pages.

Huang, Y.H., et al., "Hybrid Zero-Valent Iron Process for Removing Heavy Metals and Nitrate From Flue-Gas-Desulfurization Wastewater," Separation and Purification Technology 118:690-698, Oct. 2013.

Meng, X., et al., "Removal of Selenocyanate From Water Using Elemental Iron," Water Research 36(15):3867-3873, Sep. 2002.

Yang, Z., "Removal of Selenium From Wastewater Using ZVI and Hybrid ZVI/Iron Oxide Process," Master's Thesis, Texas A&M University, College Station, Texas, Dec. 2012, 63 pages.

Yoon, I.-H., et al., "Selenate Removal by Zero-Valent Iron in Oxic Condition: The Role of Fe(II) and Selenate Removal Mechanism," Environmental Science and Pollution Research International 23(2):1081-1090, Jan. 2016.

\* cited by examiner

METHODS FOR TREATING SELENOCYANATE IN WASTEWATER

CROSS-REFERENCE TO RELATED APPLICATIONS

This application is a continuation of application Ser. No. 15/769,279, now U.S. Pat. No. 11,235,994, which is a US national phase of PCT/US16/57911, filed Oct. 20, 2016, which claims the benefit of application Ser. No. 62/244,693, filed Oct. 21, 2015, each of which is expressly incorporated herein by reference in its entirety.

FIELD OF THE INVENTION

The present invention relates to methods for treating selenocyanate in wastewater, particularly a method for removing selenocyanate from wastewater using a hybrid zero-valent iron system that includes an oxidation pre-treatment stage.

BACKGROUND OF THE INVENTION

Selenium is present in a variety of industry wastewaters and is increasingly recognized as a pollutant of significant concern. In recent years, both federal and local environmental regulatory bodies have moved towards imposing strict limits for selenium concentrations in industrial effluent discharges. In industrial wastewaters, selenium may be present in various forms. Selenium oxyanions, such as selenate ($SeO_4^{2-}$) and selenite ($SeO_3^{2-}$) are more commonly found in coal-fired power plant and mining waste streams, and reduced forms, such as selenocyanate ($SeCN^-$), are often present in the sour-stripped water from the oil refining process.

Removing selenium from wastewater represents a challenge and a mandate to the water industry, particularly when selenium is in form of selenocyanate. In 2013, the U.S. Environmental Protection Agency proposed a limit of 10 ppb (µg/L) for selenium monthly average for the thermoelectric power industry. Some local and state authorities have enacted even lower limits for certain wastewater effluents (e.g., 4.7 ppb for total selenium imposed in mining and refinery wastewater in some states). To comply with such strict limits, industries must often achieve over 99% removal efficiency.

Selenite ($Se^{4+}$) and selenate ($Se^{6+}$) are the most mobile forms of selenium and their primary species at neutral conditions are $HSeO_3^-$ and $SeO_4^{2-}$, respectively. Several chemical and biological methods have been demonstrated to be effective for removing these oxidized selenium compounds in wastewater to a very low concentration level.

However, in certain wastewaters, selenium exists as selenocyanate. Unlike selenite and selenate, selenium in selenocyanate ($SeCN^-$) exists in the reduced state ($Se^{2-}$). Although the zero-valent iron approach for selenium removal through direct reductive transformation works well for wastewaters containing selenite and selenate, such a direct reduction is not expected to be effective for selenocyanate removal. Because selenocyanate removal is not entirely effective by established selenium treatment methods, selenocyanate removal from wastewaters remains a challenge and is an obstacle for industries where regulations are forcing compliance with ever-more stringent effluent discharge limits for selenium.

A need exists for improved methods for removing or reducing the concentration of selenocyanate in industrial wastewaters. The present invention seeks to fulfill this need and provides further related advantages.

SUMMARY OF THE INVENTION

In one aspect, the invention provides a method for removing or reducing the concentration of selenocyanate in water. In one embodiment, the method comprises:
   treating water comprising selenocyanate with an oxidant to provide oxidant-treated water; and
   contacting the oxidant-treated water with a zero-valent iron treatment system comprising (a) a reactive solid comprising zero-valent iron and one or more iron oxide minerals in contact therewith and (b) ferrous iron, whereby the concentration of selenocyanate in the oxidant-treated water is reduced by the action of the oxidant on selenocyanate.

In another aspect, the invention provides a system for removing or reducing the concentration of selenocyanate in water. In one embodiment, the system comprises:
   a first vessel for receiving water comprising selenocyanate, wherein the first vessel comprises an oxidant; and
   a first reactor in fluid communication with the first vessel for receiving oxidant-treated water from the first vessel, wherein the first reactor comprises a zero-valent iron treatment system comprising (a) a reactive solid comprising zero-valent iron and one or more iron oxide minerals in contact therewith and (b) ferrous iron.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

The present invention provides methods and systems for removing or reducing the concentration of selenocyanate in water. In the methods and systems, water containing selenocyanate is treated with an oxidant to provide oxidant-treated water, which is then contacted with a zero-valent iron treatment system comprising (a) a reactive solid comprising zero-valent iron and one or more iron oxide minerals in contact therewith and (b) ferrous iron.

In the methods of the invention, oxidation occurs prior to the zero-valent iron treatment (e.g., first stage of a multiple stage zero-valent iron treatment). In certain embodiments, oxidant is added to the wastewater feed tank to mix with raw wastewater and oxidize (or destroy) the selenocyanate to provide selenium species treatable by the zero-valent iron system.

Methods for Reducing the Concentration of Selenocyanate

In one aspect, the invention provides a method for removing or reducing the concentration of selenocyanate in water.

In one embodiment, the method for removing or reducing the concentration of selenocyanate in water, comprises:

treating water comprising selenocyanate with an oxidant to provide oxidant-treated water; and contacting the oxidant-treated water with a zero-valent iron treatment system comprising (a) a reactive solid comprising zero-valent iron and one or more iron oxide minerals in contact therewith and (b) ferrous iron, whereby the concentration of selenocyanate in the oxidant-treated water is reduced by the action of the oxidant on selenocyanate.

Suitable oxidants for treating the selenocyanate-containing water include chemical oxidants effective for oxidizing selenocyanate in water to a selenium species reducible by zero-valent iron treatment. Representative chemical oxidants include hypochlorite, hydrogen peroxide, permanganate, and persulfate. It will be appreciated that certain of the oxidants are commercially available as salts (e.g., sodium, potassium salts of hypochlorite, permanganate, and persulfate) and that the reference to these oxidants includes their salts. In one embodiment, the oxidant is sodium hypochlorite. In another embodiment, the oxidant is potassium permanganate. In a further embodiment, the oxidant is ammonium persulfate.

As used herein, the term "chemical oxidant" refers to a chemical (e.g., a solid oxidant or a solution prepared from a solid oxidant) and does not include gaseous oxidants such as oxygen or oxygen-containing gases (e.g., air).

The amount or concentration of oxidant effective to treat the selenocyanate-containing water will vary depending of the water and the amount or concentration of selenocyaante in the water. In certain embodiments, the concentration of oxidant is from about 1 to about 100 mg/L. In certain embodiments, the concentration of oxidant is from about 10 to about 50 mg/L. In certain embodiments, the concentration of oxidant is about 10 mg/L.

In certain embodiments of the method, treating water comprising selenocyanate with an oxidant to provide oxidant-treated water comprises treating the water with the oxidant in a first vessel. In this embodiment, the concentration of oxidant in the first vessel is maintained at about 1 to about 100 mg/L. In certain embodiments, contacting the oxidant-treated water with a zero-valent iron treatment system occurs in a first reactor. In these embodiments, the first reactor is a packed bed or a fluidized bed. In certain embodiments, the ferrous iron of the zero-valent iron treatment system is continuously introduced to the first reactor.

It will be appreciated that the methods of the invention can include more than one zero-valent iron reactor (e.g., multi-stage zero-valent iron reactors include in two, three, four, five, six, seven, or eight zero-valent iron reactors).

In addition to treating waters containing selenocyanate, the methods of the invention are effective for treating waters including selenium species such as selenate ($Se^{6+}$), selenite ($Se^{4+}$), and selenide ($Se^{-2}$) species. Representative additional selenium species include selenomethionines, and methylselenic acids.

In certain embodiments, the method does not include introducing air or oxygen (aeration) to the water containing selenocyanate either in the oxidation step or the zero-valent iron treatment step.

The present invention provides an improved method for reducing the concentration of selenocyanate in water involving contacting the water containing selenocyanate with a zero-valent iron treatment system comprising (a) a reactive solid comprising zero-valent iron and one or more iron oxide minerals in contact therewith and (b) ferrous iron, the improvement comprising treating the water comprising selenocyanate with an oxidant prior to contacting the water with the zero-valent iron treatment system.

It will be appreciated that the oxidation step of the method of the invention can be effectively coupled with any treatment system that is effective for removing or reducing the concentration of contaminants. The oxidation step can be combined with treatment systems other than zero-valent iron treatment systems and with zero-valent iron treatment systems that are not hybrid zero-valent iron systems (i.e., zero-valent iron systems that utilize zero-valent iron alone without the use of ferrous iron to maintain the activity of the zero-valent iron).

Zero-Valent Iron Treatment System. The methods of the invention utilize a zero-valent iron treatment system (Fe(O)/$FeO_x$/$Fe^{2+}$) for reducing the concentration of selenocyanate. In the method, water containing selenocyanate is treated with an oxidant to provide oxidant-treated water, which is then contacted with a zero-valent iron treatment system comprising (a) a reactive solid comprising zero-valent iron and one or more iron oxide minerals in contact therewith and (b) ferrous iron. In certain embodiments, the one or more iron oxide minerals of the reactive solid comprise magnetite. In certain embodiments, the reactive solid comprises a plurality of particles.

Zero-valent iron treatment systems that utilize ZVI composites to reduce the concentration of a variety contaminants are useful in the methods of the invention and include those described in US 2011/0174743 and US 2012/0273431, each expressly incorporated by reference in its entirety. In these zero-valent iron treatment systems, also known as hybrid zero-valent iron (hZVI) treatment systems, a zero-valent iron [Fe(O)/$FeO_x$/$Fe^{2+}$] composite (also referred to as a hybrid zero-valent iron composite or hybrid ZVI composite) includes a reactive solid [zero valent iron (Fe(O) or ZVI) and iron oxide ($FeO_x$)] and a secondary reagent [ferrous iron, (Fe(II), or $Fe^{2+}$)]. In the methods, the reactive solid is effective for removing and/or reducing the concentration of contaminants in a fluid. In certain embodiments, the composite is a particle having a core comprising zero-valent iron and a layer associated with the core that includes the reactive material.

In zero-valent iron treatment systems, the zero-valent iron serves as a reductant that is effective to reduce the contaminant species such that the reducible contaminant species are removed from solution and converted into a solid, thereby effectively reducing the concentration of the contaminant in solution (e.g., contaminated water). The ferrous iron of the system serves to maintain the activity of the zero-valent iron component of the system.

An advantage of the hybrid ZVI composite and system is the sustainability of a high level of activity and improved lifetime, particularly in comparison to compositions or systems that include zero-valent iron alone (i.e., without supplemental ferrous iron).

The reactive composite can be produced by an activation process. The activation process may involve oxidizing at least a portion of a zero-valent iron so as to form an iron oxide and exposing the iron oxide to dissolved ferrous ion to form the reactive material. The ferrous ion may adsorb onto and become a part of the composite. The reactive composite may be produced in situ as part of a contaminant removal process.

Treatable Contaminated Fluids. A variety of selenocyanate-containing waters may be treated according to the methods of the invention. Representative treatable waters include flue gas desulfurization wastewater, industrial waste streams, oil refinery waste, tail water of a mining operation, stripped sour water, surface water, ground water, and an influent stream. Industrial waste streams include streams of various industrial processes. An industrial waste stream treatable by the method of the invention can be produced at any stage of an industrial process. In one embodiment, the water is a flue gas desulfurization (FGD) wastewater. In one embodiment, the water is oil refinery waste. In one embodiment, the water is tail water of a mining operation. In one embodiment, the water is stripped sour water.

Contaminants and Contaminant Removal. In addition to removing or reducing the concentration of selenocyanate, the methods of the invention are effective for reducing the concentration of other contaminants whose concentration can be reduced by zero-valent iron system treatment.

Contaminants that can be removed or their concentration reduced include metal compounds, metal ions, metal oxides, metalloids, oxyanions, chlorinated organic compounds, and combinations thereof.

Examples of contaminants treatable by the methods of the invention include toxic materials, such as toxic metals. Non-limiting examples of toxic metals include arsenic, aluminum, antimony, beryllium, mercury, cobalt, lead, cadmium, chromium, silver, zinc, nickel, molybdenum, thallium, vanadium, and the like, ions thereof, and compounds thereof.

Treatable contaminants can include metalloid contaminants, such as boron and ions thereof; oxyanions, such borates, nitrates, bromates, iodates, and periodates; and chlorinated organic compounds.

Waters treatable by the methods of the invention can include mixtures of the contaminants noted above.

Representative contaminants that can be removed or their concentration reduced include arsenic compounds, aluminum compounds, antimony compounds, beryllium compounds, mercury compounds, cobalt compounds, lead compounds, cadmium compounds, chromium compounds, silver compounds, zinc compounds, nickel compounds, molybdenum compounds, thallium compounds, vanadium compounds, arsenic ion, aluminum ion, antimony ion, beryllium ion, mercury ion, selenium ion, cobalt ion, lead ion, cadmium ion, chromium ion, silver ion, zinc ion, nickel ion, molybdenum ion, thallium ion, vanadium ion, borates, nitrates, bromates, iodates, periodates, trichloroethylene, dissolved silica, and combinations thereof.

Systems for Reducing the Concentration of Selenocyanate

In another aspect, the invention provides systems for reducing the concentration of selenocyanate in water. In one embodiment, the system comprises:
  a first vessel for receiving water comprising selenocyanate, wherein the first vessel comprises aqueous oxidant; and
  a first reactor in fluid communication with the first vessel for receiving oxidant-treated water from the first vessel, wherein the first reactor comprises a zero-valent iron treatment system comprising (a) a reactive solid comprising zero-valent iron and one or more iron oxide minerals in contact therewith and (b) ferrous iron.

Exemplary zero-valent iron treatment systems useful in the methods of the invention include those described in U.S. 2011/01747443 and U.S. 2012/027343, each expressly incorporated herein by reference in its entirety. Single-stage and multiple-stage reactor systems can be used.

In some embodiments, the system is a single-stage reactor system and includes a single reactor (e.g., a fluidized bed reactor). In other embodiments, the system is a multiple-stage reactor system and includes two or more reactors. The systems may further include one or more of the following: an internal solid/liquid separating zone (e.g., settling zone), an aerating basin, a settling basin, and a filtration bed.

Figure 1:
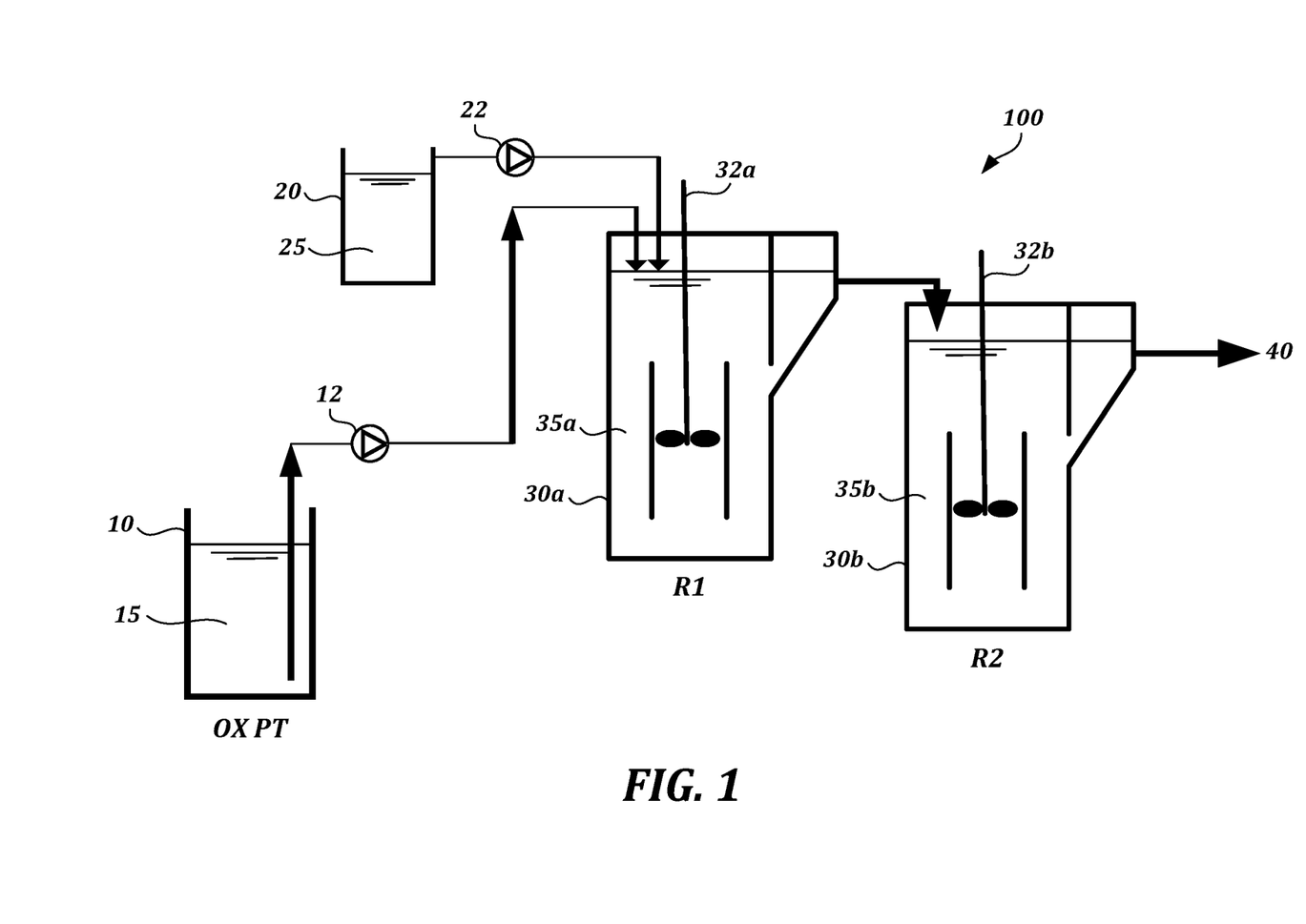
FIG. 1 is a schematic illustration of a representative two-stage hybrid zero-valent iron (hZVI or activated iron) treatment system: oxidation pre-treatment (OX PT); first stage zero-valent iron reduction (R1); and second stage zero-valent iron reduction (R2).

FIG. 1 is a schematic illustration of a representative two-stage hybrid zero-valent iron (hZVI or activated iron) treatment system: oxidation pre-treatment (OX PT); first stage zero-valent iron reduction (R1); and second stage zero-valent iron reduction (R2). Referring to FIG. 1, system 100 includes oxidation pre-treatment (OX PT) vessel 10 comprising aqueous oxidant (e.g., oxidant in raw wastewater) which provides oxidant-treated wastewater 15; first hZVI reactor R1 (30a); and second hZVI reactor R2 (30b). Ferrous iron solution 25 is delivered from vessel 20 to first reactor 30a (R1) via pump 22. Oxidant-treated wastewater 15 is delivered to first reactor 30a via pump 12. First reactor 30a includes first stage ZVI-treated water 35a, which is conducted to second reactor 30b (R1) to provide second stage ZVI-treated water 35b. Each of the first and second reactors includes a stirrer (32a and 32b, respectively). Treated effluent 40 is conducted from second reactor 30b.

Removal of SeCN⁻ in a hZVI Treatment System

Tests confirmed that $SeCN^-$ cannot be directly adsorbed and effectively removed by iron oxide surface. This observation is in agreement with what has been known in industry that the conventional chemical coagulation/adsorption/precipitation methods are ineffective for $SeCN^-$ removal.

Under certain conditions, the hZVI reactive system can be very effective in removing $SeCN^-$. However, the poor $SeCN^-$ removal observed in the batch test controlled under strict deoxygenated system indicate that in the absence of dissolved oxygen, $SeCN^-$ cannot be removed effectively. See Example 1, Tests A-C). In the continuous treatment system described herein, it has to be noted that all treatment systems were operated under the impact of various oxygen loading conditions, even the test that did not use forced aeration: (a) the reactors were open to air in its surface and certain level of oxygen diffusion from the exposed water surface into the reactor bulk liquid is inevitable; (b) the feed, which is stored in a tank open to air, naturally carried dissolved oxygen of 6-8 mg/L. See Example 2.

Effective $SeCN^-$ removal in the hZVI system appears to depend on certain chemical transformations that occur when the hZVI media interacts with dissolved oxygen (DO) and $SeCN^-$ in the presence of $Fe^{2+}$. Dissolved oxygen and ferrous iron are essential, which might be responsible for facilitating certain chemical transformation of $SeCN^-$ that the final removal of Se by the hZVI media. The role of dissolved oxygen might involve oxidation of $SeCN^-$ that results in severing the bond between Se and CN. See Example 3.

REPRESENTATIVE EMBODIMENTS

Continuous flow tests showed that $SeCN^-$ can be removed in the hZVI treatment system:
  direct treatment using of a regular hZVI multiple-stage treatment system (no oxidation step) (Approach A, see Example 2);
  hZVI single or multiple-stage treatment system with forced aeration in the reactors (Approach B, see Example 3); and
  oxidation pre-treatment followed by hZVI treatment in the absence of enhanced aeration (Approach C, see Examples 4 and 5).

In certain embodiments, the method includes oxidation followed by hZVI treatment with enhanced aeration. In other embodiments, method includes oxidation followed by hZVI treatment without enhanced aeration. In further embodiments, method includes oxidation followed by hZVI treatment without enhanced aeration but under atmospheric conditions (ambient air).

For Approach A, in the absence of enhanced aeration, the system efficiency is reduced and therefore requires longer reaction time and more reactor stages to achieve the desired treatment efficiency. In such systems capital cost will be greater and the system footprint will be larger.

For Approach B, the system depends on artificially enhanced aeration to meet the dissolved oxygen requirement. With adequate supply of oxygen, the hZVI system can achieve higher Se removal with a shorter reaction time. A single stage can meet the removal efficiency requirement. A major concern of this system, however, is that oxygen as an oxidant rapidly reacts with ZVI in a hZVI system to produce iron oxides. Stoichiometric, oxidizing $SeCN^-$ to other forms only requires a relatively small amount of oxygen. Most of oxygen introduced through forced aeration reacts with ZVI and results in wasteful consumption of the hZVI media. The estimate is that ZVI consumption under forced aeration mode could be as high as 0.3 $kg/m^3$ treated.

For Approach C, the system utilizes a dedicated pretreatment reactor. $SeCN^-$ can be readily oxidized to selenate and/or selenite by common oxidants such as hypochlorite, permanganate, or hydrogen peroxide. It appears that a relatively short reaction time of (<20 min) is sufficient. Once oxidized to selenate or selenite, a conventional hZVI treatment system can be used to remove selenium without the need of dissolved oxygen. The hZVI media consumption rate of Approach C is significantly less than with Approach B. ZVI consumption is estimated to be controlled to below 0.05 $kg/m^3$ wastewater treated, depending on the wastewater quality. For the tested stripped sour water, a relatively low dosage of oxidant was sufficient to complete the oxidation goal. However, there is a possibility that for certain wastewater, the pretreatment method may fail or may require an extreme high dosage of oxidants to accomplish the tasks. The selection of strong oxidants may depend on various factors and considerations. For example, hypochlorite may not be a desirable reagent when wastewater contains organic compounds that can react with chlorine to form harmful halogenated compounds.

The following examples are provided for the purpose of illustrating, not limiting, the invention.

EXAMPLES

Materials and Methods

Materials

Several types/sources of zero-valent iron were used: (1) 325 mesh ZVI powder (>98% purity, <44 μm) (Alfa Aesar); (2) −20 mesh ZVI grain (>99% purity, <0.83 mm) (Alfa Aesar); (3) 5 μm ZVI powder (>98% purity, <10 μm) (China); and (4) Hepure H200+ iron powder (~95% purity, 10~120 μm) (Hepure Technologies LLC, Felmington, NJ.

Selenium chemicals (sodium selenate, sodium selenite, sodium selenocyanate) of reagent grade were all purchased from research chemical suppliers (Alfa Aesar).

Reactors

For batch tests, 10 mL serum vial were used as reactor vessels. The procedure of conducting serum vial test was similar to the one described in a previous publication (Huang et al. 2012). In an exemplary batch test, a dozen reactors, each pre-filled with 0.500±0.001 g iron grains, would be transferred into the anaerobic chamber, filled with designed volumes of the selenocyanate, ferrous, or nitrate solutions that added up to 10 mL in total, and then sealed with rubber stoppers and aluminum crimps. The reactors would then be placed in a rotary tumbler for mixing at 30 rpm at room temperature (21±2° C.) in the dark. At predetermined time intervals, one reactor would be withdrawn from the tumbler and opened immediately for pH measurement and the filtrate passing a filter of 0.45-μm pore size would be analyzed for dissolved interested species such as $Fe^{2+}$, selenocyanate, selenite, selenate, and nitrate.

For continuous-flow tests, two 6-liter hZVI reactors were used to form a two-stage treatment system. For continuous-flow tests, the system was started with adding 600 g fresh ZVI to each reactor (i.e., 100 g/L ZVI concentration). A preconditioning procedure (see below) was used to convert a ZVI system into a hybrid $ZVI/Fe_3O_4$ system. Upon the completion of the precondition procedure, the media in the reactor consists of about 550 g of magnetite-coated ZVI powder and 80 g of discrete magnetite crystalline. The hZVI system was then used to treat selenocyanate-contaminated wastewater.

Routine Water Quality Analyses

Common water quality parameters such as pH, DO (dissolved oxygen), ORP (oxidation reduction potential), TDS (total dissolved salts) and common cations ($Ca^{2+}$, $Mg^{2+}$, $Na^+$, $NH_4^+$, and $Fe^{2+}$) and anions ($Cl^-$, $SO_4^{2-}$, $NO_3^-$) constituents in water were analyzed using methods adopted by the US Environmental Protection Agency (EPA).

Selenium Analyses

Selenate and selenite were analyzed using a Dionex DX500 Ion Chromatography (IC) equipped with a conductivity detector (CD20) and an autosampler (AS50). Dionex IonPac AS22 and AS18 separation columns were used for selenate and selenite ion analyses, respectively. The detection limit is 0.05 mg/L for both selenate and selenite.

Selenocyanate was analyzed on the Dionex IC system noted above, using IonPac AS16 as the separation column. The detection limit for selenocyanate is 0.05 mg/L.

Total selenium (Total Se) was determined using a Hydride-Generation Atomic Absorption Spectroscopy (HG-AAS) on a Perkin-Elmer AAnalyst400 system. The samples were first pre-oxidized using 6 N HCl and boiling-bathed (sample vials were bathed in boiling water) for 1 hr before analyses. The method has a detection limit of 1 ppb for total selenium.

The concentration of all these selenium compounds is reported as Se concentration.

Wastewater

Both synthetic wastewater and actual stripped sour water (SSW) were used. Actual stripped sour water was supplied by two refinery plants, one in California and one in New Mexico. The synthetic wastewater was made by dissolving known chemicals (e.g., NaSeCN) to simulate the composition and characteristics of the wastewater.

hZVI System Preconditioning Method. A nitrate-$Fe^{2+}$ pretreatment method was used to convert a pure ZVI system into the hybrid ZVI (hZVI) system (also referred to herein as an activated iron system or a hybrid ZVI+$Fe_3O_4$ system) as described in Huang, Y. H.; Zhang, T. C.; Shea, P. J.; Comfort, S. D., "Effects of Oxide Coating and Selected Cations on Nitrate Reduction by Iron Metal," *Journal of Environmental Quality* 2003, 32(4), 1306-1315; and Huang, Y. H.; Tang, C.; Zeng, H., "Removing molybdate from water using a hybridized zero-valent iron/magnetite/Fe(II) treatment system," *Chemical Engineering Journal* 2012, 200-202(O), 257-263, each expressly incorporated herein by reference in its entirety. For the batch test in 6 L reactor and continuous-flow test in 2 L reactor, 14.3 mM $NaNO_3$ (200 mg/L as N), and 10 mM $FeCl_2$ were added into the reactor containing with 50 g/L ZVI. The reactors were mixed with overhead electric stirrer overnight to allow ZVI/Fe(II)-nitrate reaction. The nitrate is reduced by ZVI with magnetite as the iron corrosion product following the Eq. (1):

$$NO_3^- + 2.82Fe^0 + 0.75Fe^{2+} + 2.25H_2O \rightarrow NH_4^+ + 1.19Fe_3O_4 + 0.50OH^- \quad (1)$$

Upon preconditioning, about 5% of the initial ZVI was consumed, resulting in a magnetite concentration of about 5 g/L in the reactor. Unless otherwise stated, tests were conducted with 5 μm ZVI and with 325 mesh ZVI.

Example 1

Selenocyanate Removal Methods: Batch Tests hZVI Treatment

In this example, batch methods for removal of selenocyanate using a hZVI treatment system without oxidation pre-treatment step are described.

Batch tests were conducted to evaluate the effectiveness of both a zero-valent iron (ZVI) and a hybrid zero-valent iron (hZVI) system for removal of selenocyanate from wastewater. In these tests, 10 mL serum vials were used as the reactor.

Test A

Initial conditions in the reactor: 0.5 g 20-mesh fresh ZVI powder+10 mL de-oxygenated DI (DDI) water spiked with (10 mg/L $SeCN^-$+28 mg/L $Fe^{2+}$)+anaerobic headspace (1.4 mL Na); $Fe^{2+}$ was added as $FeCl_2$.

Only <10% $SeCN^-$ was removed during the test period of 24 hr. The result shows that fresh ZVI powder cannot effectively remove $SeCN^-$ under a strict anaerobic condition (in the absence of oxygen).

Test B

Initial conditions: 0.5 g hZVI media+10 mL DDI water spiked with (10 mg/L $SeCN^-$+28 mg/L $Fe^{2+}$)+anaerobic headspace.

The activated iron media (or hZVI media) was prepared as described above using the nitrate-Fe(II) treatment method to precondition ZVI grains (20-mesh) and convert to the hZVI media. Upon preconditioning process, the media in the serum vial reactor consisted of approximate 0.40 g magnetite-coated ZVI grains+0.1 g $Fe_3O_4$ fine powder in discrete form.

After 24 hr treatment, 5.4 mg/L $SeCN^-$ remained in the reactor (46% removal was achieved). After 48 hr treatment, 5.1 mg/L $SeCN^-$ remained indicating that the hZVI media has some initial capacity for removing $SeCN^-$, but once the initial capacity was exhausted, little $SeCN^-$ was further removed. The removal of $SeCN^-$ by the hZVI media is not sustainable in a strict anaerobic condition.

Test C

Initial conditions: 0.5 g 20-mesh fresh ZVI+10 mL DI water spiked with (10 mg/L $SeCN^-$+28 mg/L $Fe^{2+}$)+air headspace (1.4 mL air of ambient temperature, 22° C. and 1 atm pressure).

At 6 hr, 83% $SeCN^-$ was removed. All $SeCN^-$ was removed at 24 hr. The presence of oxygen (air) can help the system more effectively remove $SeCN^-$ in the presence of $Fe^{2+}$.

Test D

Initial conditions: 0.5 g 20-mesh fresh ZVI+10 mL DI water spiked with 10 mg/L $SeCN^-$+air headspace (1.4 mL air of 22° C. and 1 atm pressure); no $Fe^{2+}$ was added.

At 6 hr, 26% $SeCN^-$ was removed; by 24 hr, 35% $SeCN^-$ was removed. Comparison between Test C and Test D shows that in the absence of externally-added $Fe^{2+}$, the ZVI system appears to be passivated; and the reactivity responsible for removing $SeCN^-$ is significantly decreased in the absence of dissolved $Fe^{2+}$.

Test E

Initial conditions: 0.5 g hZVI media+10 mL DI water spiked with (10 mg/L $SeCN^-$+28 mg/L $Fe^{2+}$)+air headspace (1.4 mL air).

The hZVI media was prepared freshly using the nitrate-Fe(II) method described above. The media composition was estimated as 0.4 g ZVI+0.1 g $Fe_3O_4$.

All $SeCN^-$ was removed by 4 hr.

Conclusions

Fresh ZVI (regular ZVI powder as received from vendor) alone is not very effective for removing $SeCN^-$. Conditioned hZVI media is significantly more effective in removing $SeCN^-$ than fresh ZVI.

Introduction of oxygen into the hZVI system to mix the activated iron media with oxygen and wastewater greatly enhanced $SeCN^-$ removal.

The presence of dissolved $Fe^{2+}$ is essential to maintaining high reactivity of the hZVI system for $SeCN^-$ removal.

These tests demonstrate that a reactive chemical system consisting of hZVI media+$Fe^{2+}$+$O_2$ is effective for treating $SeCN^-$-contaminated wastewater.

Example 2

Selenocyanate Removal Method: Continuous-Flow Test hZVI Treatment

In this example, a continuous-flow method for removal of selenocyanate using hZVI treatment is described.

A continuous-flow test (two-stage) was conducted to evaluate the effectiveness of a hybrid zero-valent iron (hZVI) system for removal of selenocyanate from wastewater. A flow diagram of the two-stage continuous-flow treatment system is shown in FIG. 1. Referring to FIG. 1: Feed→Reactor 1 (6 L)→Reactor 2 (6 L)→Effluent.

Test I: $SeCN^-$ Removal by hZVI Process

Feed: synthetic wastewater, prepared by spiking DI water with 10 mg/L $SeCN^-$.

Media preparation: Added 600 g 325-mesh fresh ZVI powder into both Reactor 1 and Reactor 2; media concentration in both reactors was 100 g/L.

Added 0.24 mol $NaNO_3$ (20.4 g)+0.17 mol $FeCl_2$ (33.3 g $FeCl_2.4H_2O$) into each reactor; allow the reactor to operate in batch mode for 24 hours to coat the fresh ZVI surface with $Fe_3O_4$ and also to produce sufficient amount of discrete $Fe_3O_4$ crystalline. Upon the completion of the preconditioning process, the media in each reactor consisted of approximately 560 g magnetite-coated ZVI+60 g $Fe_3O_4$ discrete particles.

Influent flow rate: Q=2 L/hr, correspondingly, HRT=3 hr in R1+3 hr in R2.

$Fe^{2+}$ dosage: 0.3 mM or 17 mg/L into R1 and R2 each

TABLE 1

Selenium removal.

| | Time (day) | | | | | | | |
|---|---|---|---|---|---|---|---|---|
| | Day 1 | Day 2 | Day 3 | Day 4 | Day 5 | Day 6 | Day 7 | Average |
| Influent (ppm) | 10 | 10 | 10 | 10 | 10 | 10 | 10 | 10 |
| R1 (ppm) | 6.2 | 6.8 | 5.2 | 6.5 | 6.2 | 5.7 | 6.4 | 6.1 ± 0.54 |
| R2 (ppm) | 0.8 | 0.5 | 0.3 | 0.7 | 0.6 | 0.5 | 0.7 | 0.59 ± 0.17 |
| Removal (%) | 92% | 95% | 97% | 93% | 94% | 95% | 93% | 94.1% |

Figure 2:
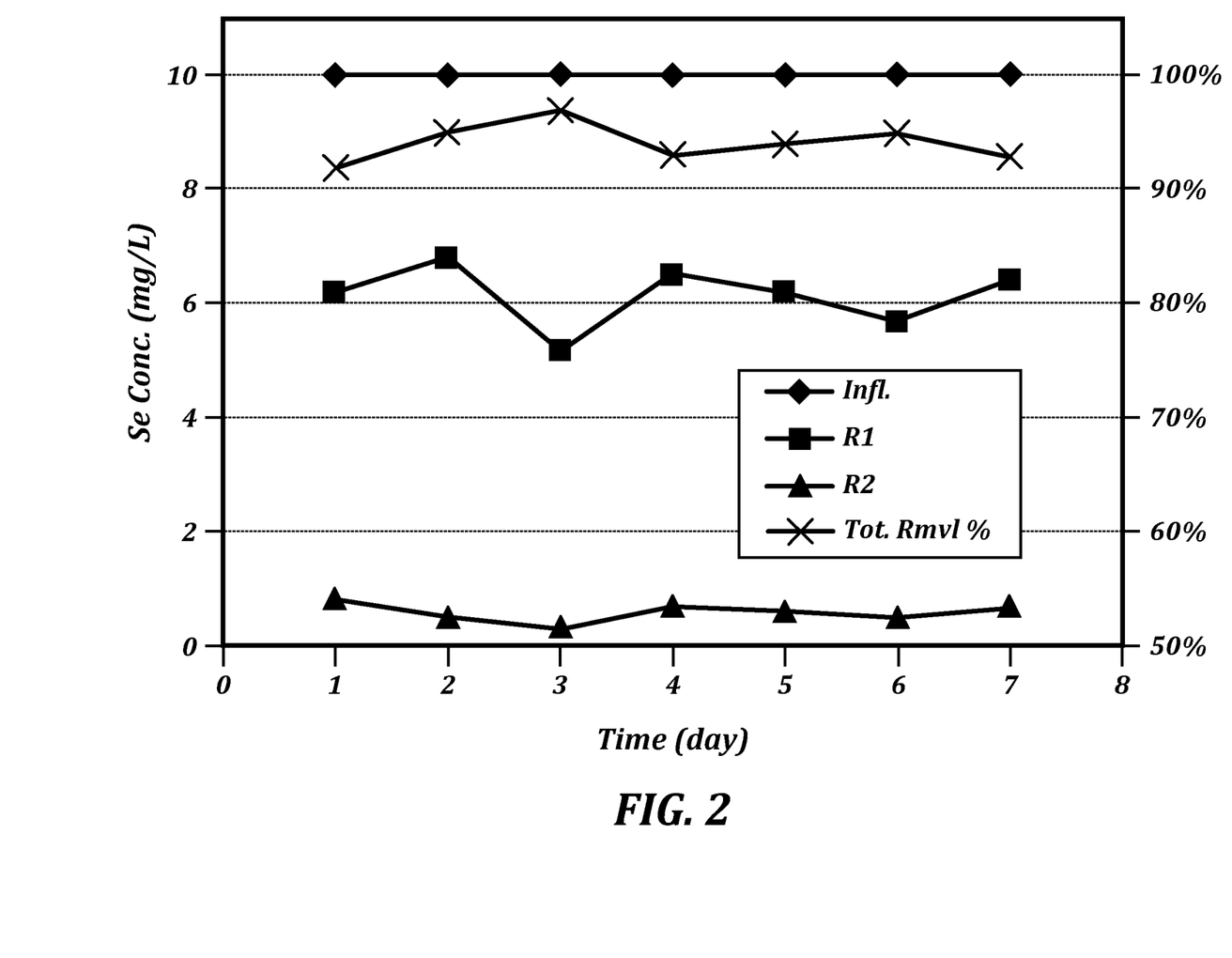
FIG. 2 graphically illustrates results for removal of $SeCN^-$ in a representative method of the invention, a continuous-flow two-stage hZVI treatment system.

Results for removal of SeCN⁻ in a continuous-flow two-stage hZVI treatment system (Test I) are illustrated graphically in FIG. 2.

A two-stage hZVI treatment system was demonstrated to consistently remove greater than 90% of SeCN— with a total reaction time of 6 hr.

Example 3

Selenocyanate Removal Method: Continuous-Flow Test hZVI Treatment with Aeration

In this example, a continuous-flow method for removal of selenocyanate using a forced aeration hZVI process is described.

A continuous-flow test (two-stage) was conducted to evaluate the effectiveness of a zero-valent iron (hZVI) system with aeration for removal of selenocyanate from wastewater. A flow diagram of the two-stage continuous-flow treatment system is shown in FIG. 1. Referring to FIG. 1: Feed 4 Reactor 1 (6 L)→Reactor 2 (6 L)→Effluent.

Test II: SeCN⁻ Removal by a hZVI+Forced Aeration Process

Feed: synthetic wastewater, prepared by spiking DI water with 10 mg/L SeCN⁻.

Media preparation: used the hZVI media from Test I.

Influent flow rate: Q=2.0 L/hr, corresponding HRT=3 hr in R1+3 hr in R2.

$Fe^{2+}$ dosage: 0.3 mM or 17 mg/L.

Aeration: An air pump (aquarium pump purchased from WalMart) was used to supply air through a submersed tube (about 2 mm i.d.) to aerate Reactor 1. The air flow rate was controlled at about 15 mL/s. The aeration tube was inserted into the reaction zone of R1 at a depth of 2 inch.

TABLE 2

Selenium removal.

| | Time (day) | | | | | | |
|---|---|---|---|---|---|---|---|
| | Day 1 | Day 2 | Day 3 | Day 4 | Day 5 | Day 6 | Average |
| Influent (ppm) | 10 | 10 | 10 | 10 | 10 | 10 | 10 |
| R1 (ppm) | 0.25 | 0.28 | 0.32 | 0.42 | 0.48 | 0.43 | 0.36 ± 0.09 |
| R2 (ppm) | ND (<0.05) | ND | ND | ND | ND | ND | |
| Removal (%) | 100% | 100% | 100% | 100% | 100% | 100% | 100% |

The results demonstrate that artificially forced aeration in the reaction zone greatly improved SeCN⁻ removal by the hZVI treatment system, and one single-stage treatment with a reaction time of 3 hr is sufficient to achieve over 95% removal.

Example 4

Representative Selenocyanate Removal Method: Continuous-Flow Test with hZVI Treatment with Oxidation Step In this example, a representative continuous-flow method for selenocyanate removal using oxidation pre-treatment combined with zero-valent iron (hZVI) system is described.

A continuous-flow test (two-stage) was conducted to evaluate the effectiveness of oxidation combined with a zero-valent iron (hZVI) system for removal of selenocyanate from wastewater. A flow diagram of the two-stage continuous-flow treatment system is shown in FIG. 1. Referring to FIG. 1: Feed 4 Reactor 1 (6 L)→Reactor 2 (6 L)→Effluent.

Test III: Treating SeCN⁻ with Oxidation Combined with the hZVI Treatment

Feed: synthetic wastewater, prepared by spiking DI water with 10 mg/L SeCN⁻ as Se.

Wastewater pretreatment: Added sodium hypochlorite at a dosage of 10 mg/L into the feed tank to oxidize SeCN⁻ for 20 min; water samples collected from the feed tank after 20 min was analyzed; after pre-oxidation, no SeCN⁻ was remained in the feed; instead 8.3 mg/L selenate-Se and 1.5 mg/L selenite was detected.

Media preparation: 100 g/L, hZVI media freshly prepared following the same preconditioning method as described in Test I.

Feed rate: Q=2.0 L/hr of pretreated wastewater, corresponding HRT=3 hr in R1+3 hr in R2.

$Fe^{2+}$ dosage: 0.3 mM or 17 mg/L.

Aeration: none.

No dissolved selenium was detected in all treated samples in R1. Selenium in form of selenite or selenate after per-oxidation process was completely removed in R1.

TABLE 3

Selenium removal.

| | Time (day) | | | | |
|---|---|---|---|---|---|
| | Day 1 | Day 2 | Day 3 | Day 4 | Day 5 |
| Influent (ppm) | 10 | 10 | 10 | 10 | 10 |
| R1 (ppm) | ND (<0.05) | ND | ND | ND | ND |
| R2 (ppm) | ND (<0.05) | ND | ND | ND | ND |
| Removal (%) | 100% | 100% | 100% | 100% | 100% |

The results show that oxidation pre-treatment transforms SeCN⁻ into other selenium species. Oxidants (hypochlorite, hydrogen peroxide, permanganate, persulfate) rapidly oxidize SeCN⁻ to selenate ($SeO_4^{2-}$) or selenite ($SeO_3^{2-}$), which can then be more effectively removed by the hZVI system.

Example 5

Representative Selenocyanate Removal Method: Stripped Sour Water with hZVI Treatment with Oxidation Pre-Treatment Step In this example, a representative continuous-flow method for selenocyanate removal using oxidation pre-treatment combined with zero-valent iron (hZVI) system for stripped sour water treatment is described.

A continuous-flow test (two-stage) was conducted to evaluate the effectiveness of oxidation pre-treatment combined with a zero-valent iron (hZVI) system for removal of selenocyanate from stripped sour wastewater. A flow diagram of the two-stage continuous-flow treatment system is shown in FIG. 1. Referring to FIG. 1: Feed 4 Reactor 1 (6 L)→Reactor 2 (6 L)→Effluent.

Test IV: Stripped Sour Water Treatment Test Using a Oxidation+hZVI System

Feed: 80 liter real stripped sour water (SSW), provided by Valero Energy from one of its refinery (Wilmington Plant, CA).

Composition of SSW: 650 ppb $SeCN^-$ as Se, low TDS, about 40 mg/L $NH_4^+$, some phenolics, pH=~6.5.

Feed Pretreatment: Add $H_2O_2$ at a dosage of 20 mg/L into the feed tank to pre-oxidize $SeCN^-$ for 1 hr before testing. No $SeCN^-$ was detected after pretreatment. $SeCN^-$ was oxidized to selenite and seleate after $H_2O_2$ treatment.

Media and Preparation: hZVI Media from Test III.

Feed rate: 1.5 L/hr, corresponding HRT=4 hr in R1+4 hr in R2.

$Fe^{2+}$ dosage: 0.3 mM or 17 mg/L.

Aeration: None.

TABLE 4

Selenium removal.

| | Time (hr) | | | |
|---|---|---|---|---|
| | 12 hr | 24 hr | 36 hr | 48 hr |
| Influent (ppb) | 650 | 650 | 650 | 650 |
| R1 (ppb) | ND (<5) | ND | ND | ND |
| R2 (ppb) | ND (<5) | ND | ND | ND |

The results demonstrate that $SeCN^-$ in stripped sour water was completely removed to below the detection limit (<5 ppb) in all samples. With oxidation pre-treatment, one single stage and 4 hour reaction time was sufficient to remove Se to below 5 ppb.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for reducing the concentration of selenocyanate in water containing selenocyanate, comprising:
    in a first step, treating water containing selenocyanate with an oxidant for a time sufficient to oxidize the selenocyanate to provide selenium species treatable by a zero-valent iron system in oxidant-treated water, wherein the oxidant is a hypochlorite; and
    in a second step, contacting the oxidant-treated water with a zero-valent iron treatment system that comprises (a) a reactive solid comprising zero-valent iron and one or more iron oxide minerals in contact therewith and (b) ferrous iron, wherein the selenium species in the oxidant-treated water treatable by the zero-valent iron system are reduced.

2. The method of claim 1, wherein the hypochlorite is sodium hypochlorite or potassium hypochlorite.

3. The method of claim 1, wherein the concentration of oxidant is from about 1 to about 100 mg/L.

4. The method of claim 1, wherein treating water containing selenocyanate with oxidant to provide oxidant-treated water occurs in a first vessel.

5. The method of claim 4, wherein the concentration of oxidant in the first vessel is maintained at about 1 to about 100 mg/L.

6. The method of claim 1, wherein contacting the oxidant-treated water with the zero-valent iron treatment system occurs in a first reactor.

7. The method of claim 6, wherein the first reactor is a packed bed or a fluidized bed.

8. The method of claim 6, wherein the ferrous iron is continuously introduced to the first reactor.

9. The method of claim 1, wherein the water further comprises a selenium species selected from the group consisting of selenate ($Se^{6+}$), selenite ($Se^{4+}$), and selenide ($Se^{-2}$) species, and mixtures thereof.

10. The method of claim 1, wherein the water further comprises a selenium species selected from the group consisting of a selenate, a selenite, selenomethionine, and methylselenic acid.

11. The method of claim 1, wherein the water further comprises a contaminant selected from arsenic, aluminum, antimony, beryllium, cobalt, lead, cadmium, chromium, silver, zinc, nickel, molybdenum, thallium, vanadium, and ions and oxyanions thereof; borates, nitrates, bromates, iodates, and periodates; trichloroethylene; dissolved silica; and mixtures thereof.

12. The method of claim 1, wherein the water further comprises an oxyanion, a chlorinated organic compound, or mixtures thereof.

13. The method of claim 1, wherein the water is selected from flue gas desulfurization wastewater, industrial waste stream, oil refinery waste, tail water of a mining operation, stripped sour water, surface water, ground water, and an influent stream.

14. The method of claim 1, wherein the water is flue gas desulfurization wastewater.

15. The method of claim 1, wherein the one or more iron oxide minerals of the reactive solid comprise magnetite.

16. The method of claim 1, wherein the reactive solid comprises a plurality of particles.

17. The method of claim 1, wherein the method does not include introducing air or oxygen (aeration) to the water containing selenocyanate either in the oxidant treatment step or the zero-valent iron treatment step.

18. In a method for reducing the concentration of selenocyanate in water containing selenocyanate, comprising contacting water containing selenocyanate with a zero-valent iron treatment system comprising (a) a reactive solid comprising zero-valent iron and one or more iron oxide minerals in contact therewith and (b) ferrous iron, the improvement comprising treating the water containing selenocyanate with a hypochlorite for oxidizing selenocyanate for a time sufficient to oxidize the selenocyanate to provide selenium species treatable by a zero-valent iron system prior to contacting the water with the zero-valent iron treatment system.

19. A system for reducing the concentration of selenocyanate in water, comprising:
    a first vessel for receiving water containing selenocyanate, wherein the first vessel comprises a hypochlorite to oxidize selenocyanate to selenium species treatable by a zero valent iron system and does not comprise zero valent iron; and
    a first reactor in fluid communication with the first vessel for receiving oxidant-treated water from the first vessel, wherein the first reactor comprises a zero-valent iron treatment system comprising (a) a reactive solid comprising zero-valent iron and one or more iron oxide minerals in contact therewith and (b) ferrous iron.

20. The system of claim 19, wherein the hypochlorite is sodium hypochlorite or potassium hypochlorite.

\* \* \* \* \*